Jan. 15, 1963 F. C. ALPERS 3,074,062
SYSTEM FOR SYNCHRONIZATION AND RANGE MEASUREMENT WITH
A SEMIACTIVE-TO-ACTIVE RADAR GUIDED MISSILE
Filed Aug. 12, 1955 4 Sheets-Sheet 1
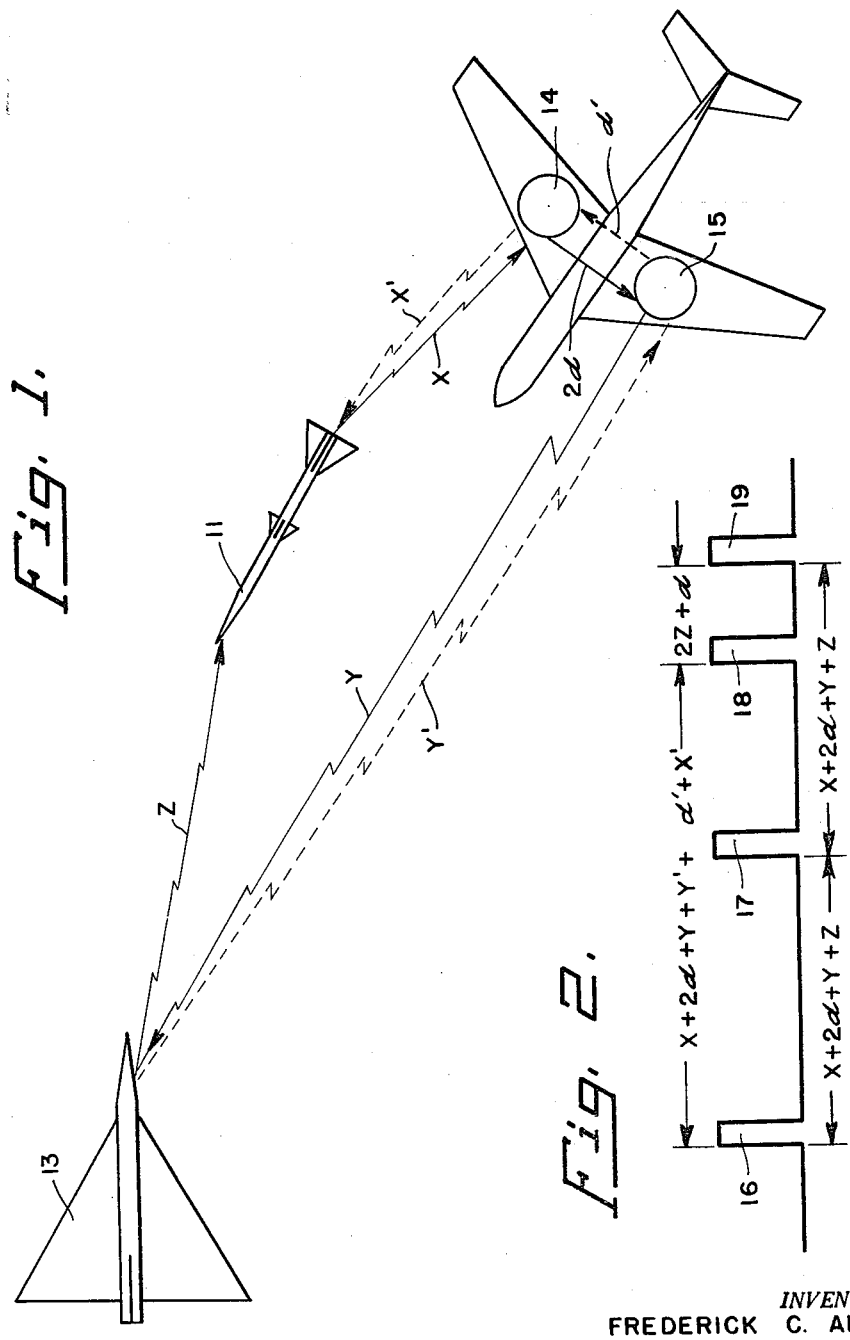
INVENTOR.
FREDERICK C. ALPERS
BY
ATTORNEYS

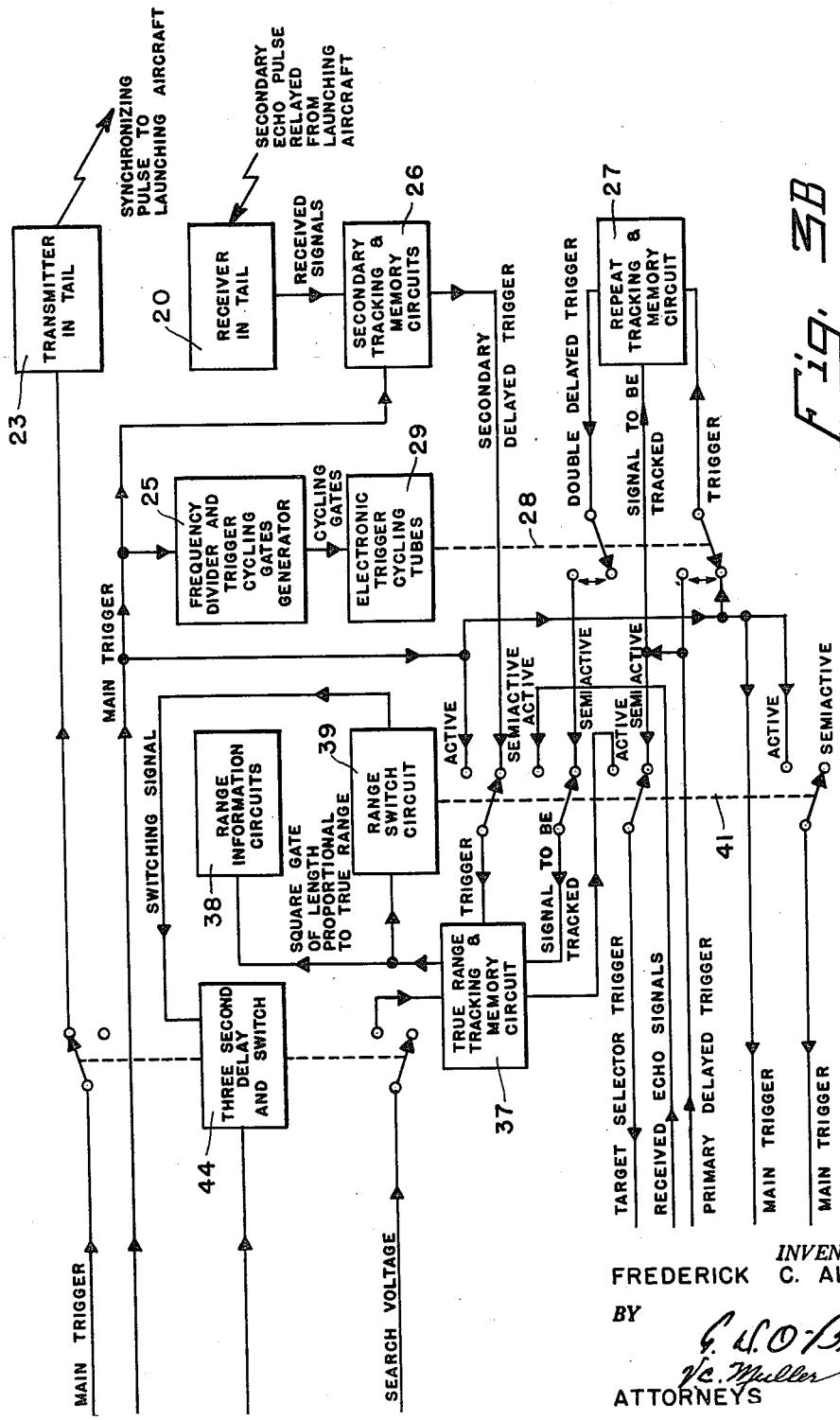

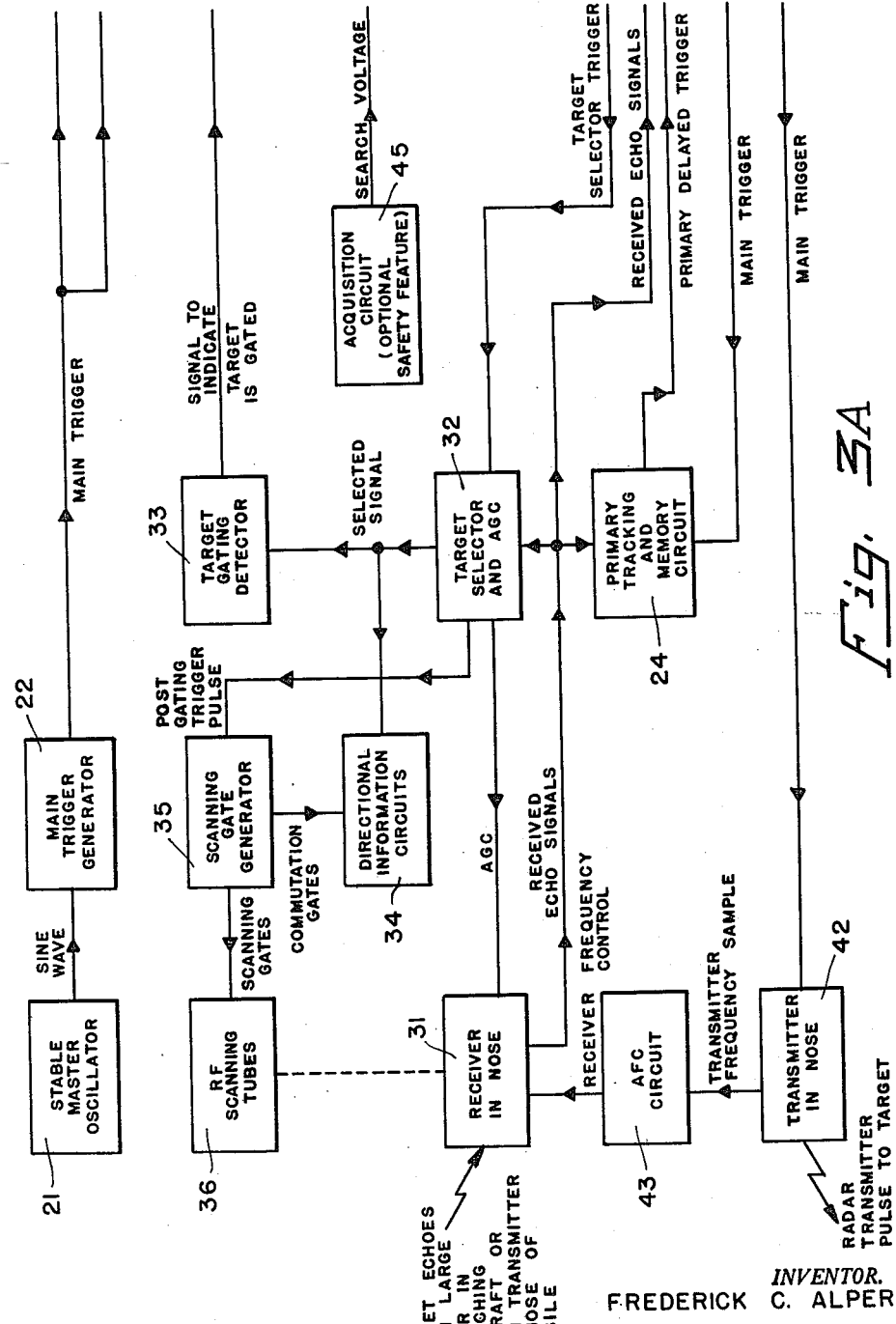

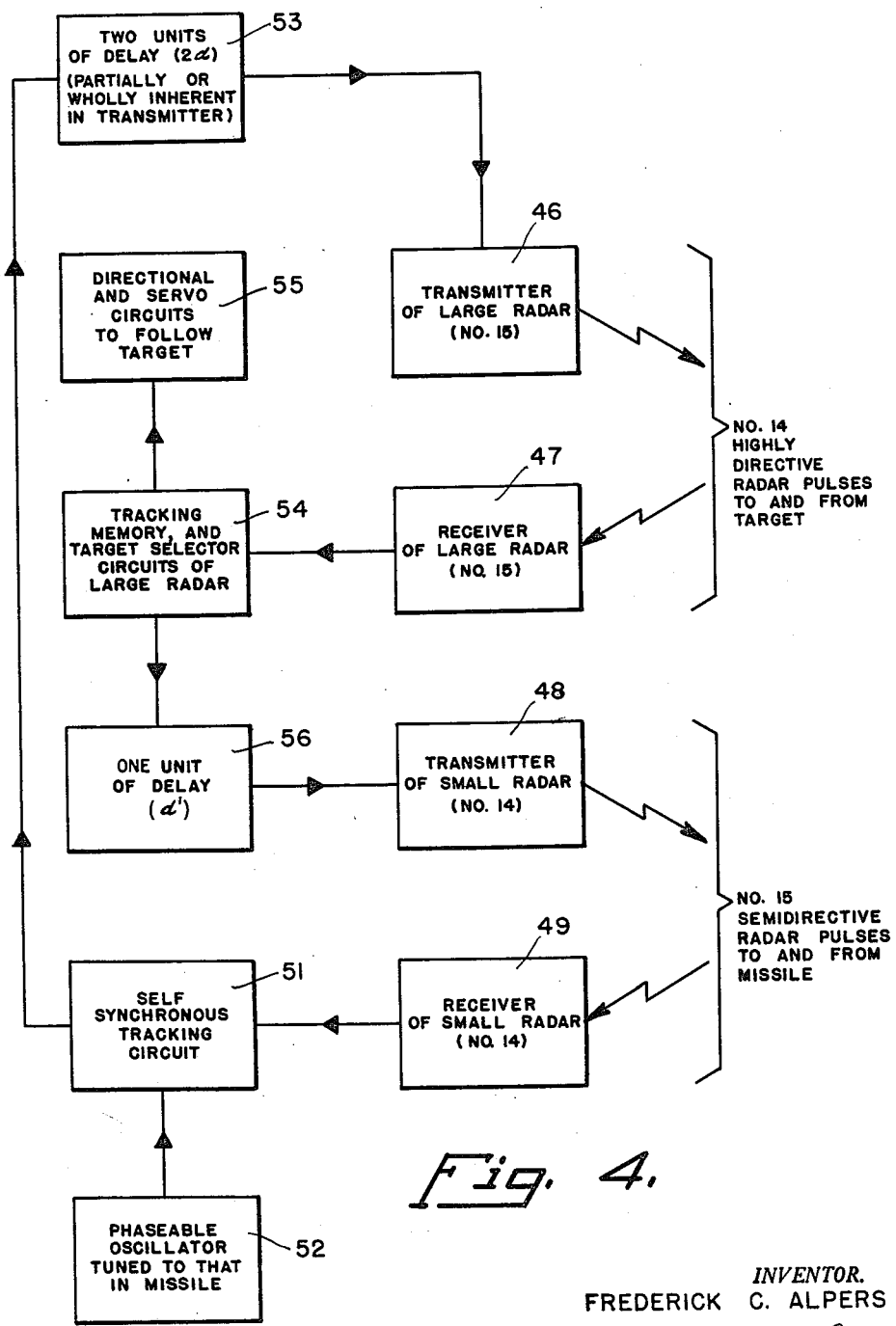

United States Patent Office 3,074,062
Patented Jan. 15, 1963

3,074,062
SYSTEM FOR SYNCHRONIZATION AND RANGE MEASUREMENT WITH A SEMIACTIVE-TO-ACTIVE RADAR GUIDED MISSILE
Frederick C. Alpers, Riverside, Calif., assignor to the United States of America as represented by the Secretary of the Navy
Filed Aug. 12, 1955, Ser. No. 528,143
7 Claims. (Cl. 343—13)
(Granted under Title 35, U.S. Code (1952), sec. 266)

The invention described herein may be manufactured and used by or for the Government of the United States of America for governmental purposes without the payment of any royalties thereon or therefor.

This invention relates to a system and means for the synchronization of pulse radars between a launching aircraft and a radar homing missile wherein the homing missile's radar is semiactive in character during the first portion of the flight but may be made active and self sustaining without loss of the originally selected target or change in range measurement during the latter part of the flight.

Previous radar homing missiles which were active in character were limited in range by the size of the radar which could be carried. Previous semiactive missiles utilized the measurement of three sides to solve a triangle by the addition and subtraction of signals representing the lengths of the triangle sides involved. However, this system required the extremely accurate transmission of part of the triangle range data from the launching aircraft to the missile.

The copending application of F. C. Alpers for a System for Synchronization and Accurate Range Measurement with a Semiactive Radar Guided Missile, Serial No. 528,141, filed August 12, 1955, now Patent No. 2,950,477, discloses a system which is semiactive in character and operates in a manner somewhat analogous to the system of the present invention during the first portion of its flight. The present system, however, benefits from the increased maximum range attainable with the larger radar of the launching device during the first portion of its flight, but attains an additional accuracy obtainable through the use of a wholly active system, and provides automatic switchover from the semiactive to the active stage.

Another copending application of F. C. Alpers for a System for Synchronization and Range Measurement With a Plurality of Radar Guided Missiles, Serial No. 528,142 filed August 12, 1955, discloses a system which is adapted for use with two or more missiles of either type.

In one preferred embodiment of the present invention the missile contains a stable oscillator which triggers a transmitter in the tail to send a synchronizing pulse to the small radar of the launching aircraft where it is transmitted through a double delay to the transmitter of a large highly directive radar which sends pulses to the target. Echo pulses from the target are reflected directly to a receiver in the nose of the missile and also to the receiver of the large radar in the launching aircraft where the pulses are transmitted through a single delay to the transmitter of the small radar and relayed back to the receiver in the tail of the missile. During the first portion of flight the missile operates as a semiactive missile with illumination from the launching aircraft and functions in a manner similar to that disclosed in the copending application of F. C. Alpers, Serial No. 528,141, now Patent No. 2,950,477, but the missile also contains a transmitter in the nose of the aircraft which is also capable of sending out a highly directional radar pulse but over a limited range as compared with the range of the launching aircraft. When the missile is well within the range of its own transmitter the circuits are switched from the semiactive to the active phase. The double delay between the receiver of the small radar and the transmitter of the large radar in the launching aircraft is provided so that the difference between the time interval for the primary path which is equal to $X+2d+Y+Z$ and the time interval for the secondary path which is equal to $$X+2d+Y+Y'+d'+X'$$

equals $2Z+d$. Thus, when the missile switches over to the active phase, the additional delay $d$ added to the time interval $2Z$ compensates for the inherent delay in the firing of the missile transmitter for the active phase, so that the range signal for both phases will be the same before and after switchover. The time interval for the radar pulse to travel the distance $2Z$ or the radar transit time between transmission and reception of the radio wave reflected from a target is proportional to actual range or distance from the target and is commonly known in the art as "radar range." The radar range signal as applied to the range tracking and memory circuits may also include the delay inherent in the firing of the radar transmitter.

One object of the present invention is to provide a means for synchronization of pulse radars between a launching device and a radar homing missile in such a way that the homing missile's radar may be semiactive in character during the initial portion of the flight and yet active and capable of accurate range measurement during a subsequent portion of the flight at close range.

Another object of the present invention is to provide a system for synchronization and accurate range measurement which is operative for greater ranges than an active missile system of comparable size and yet retains the accuracy and certain counter-measure advantages of an active system at close range.

A further object of the present invention is to provide a system of range measurement utilizing the measurement of three sides to solve a triangle wherein the third side is found by measuring the time between two pulses at the missile rather than by the addition and subtraction of signals representing the lengths of triangle sides involved to provide the optimum accuracy in range measurement.

Other objects and many of the attendant advantages of this invention will be readily appreciated as the same becomes better understood by reference to the following detailed description when considered in connection with the accompanying drawings wherein:

FIG. 1 is a schematic view illustrating the overall operation of the system of the present invention;

FIG. 2 is a pulse timing diagram for the system of the present invention;

FIGS. 3A and 3B taken together constitute a block diagram of the missile portion of the system illustrated in FIG. 1; and FIG. 4 is a block diagram of the launching aircraft portion of the system illustrated in FIG. 1.

Referring now to the drawings in detail, the missile 11 is launched by the launching aircraft 12 toward the target 13. During flight the missile 11 transmits a synchronizing pulse from a semidirective radar in the tail of the missile towards the launching aircraft which is received by the semidirective receiver of the small radar 14 on the launching aircraft. This signal is transmitted through a double delay equal to $2d$ to the transmitter of a large highly directive radar 15 and the radar pulses are directed toward the target 13. The echo pulses from the target 13 follow one path $Z$ to a receiver in the nose of the missile 11 and a second path $Y'$ back to the receiver of the large radar 15 where they are transmitted through a single delay unit $d'$ to the small radar and relayed through the transmitter along the path X' to the receiver in the tail of the missile 11.

It will be apparent that the time interval, as illustrated in FIG. 2, between the synchronizing pulse 16 from the missile and echo pulse 17 received by the missile along the primary path will be equal to $X+2d+Y+Z$. Another pulse 18, which is received along the secondary path, will have a time interval equal to $$X+2d+Y+Y'+d+X'$$

If the missile generates another pulse 19 at a time equal to twice the time between the pulses 16 and 17, it will be apparent that the difference between pulses 18 and 19 or the time interval therebetween will be equal to $2Z+d$. When the missile 11 is within range of its own directional radar transmitter in the nose of the missile, it is switched over from the semiactive to the active phase.

During this active phase the time interval between the transmitted pulse and the receiving of the echo pulse is equal to 2Z plus a delay inherent in the firing of the missile transmitter during this phase. Suitable circuitry for switching over from the semiactive to the active phase is disclosed in the circuit diagrams of FIGURE 3 and will be described subsequently.

The block diagram of FIGURE 3 illustrates one preferred embodiment of suitable circuitry in the missile 11 for carrying out the system of the present invention and consists of a receiver 20 in the tail of the missile and a stable master oscillator 21 which sends a sine wave signal to the main trigger generator 22 which in turn sends a trigger to various portions of the circuit including the transmitter 23 in the tail of the missile which sends out a synchronizing pulse to the launching aircraft 14.

The main trigger also goes to the primary tracking and memory circuit 24, to the frequency divider and trigger cycling gate generator 25, to the secondary tracking and memory circuit 26, and also to the repeat tracking and memory circuit 27 through a switch 28 actuated by the electronic trigger cycling tubes 29.

The primary tracking and memory circuit 24 is operatively associated with the receiver 31 in the nose of the missile and with the target selector and AGC circuit 32 which in turn is connected to the target gating detector 33, the directional information circuits 34, the scanning gate generator 35, and the receiver 31. The scanning gate generator 35 sends scanning gates to the RF scanning tubes 36 and commutation gates to the directional information circuits 34.

The true range tracking and memory circuit 37, receives a secondary delayed trigger from the secondary tracking and memory circuit 26 which receives a secondary echo pulse through the receiver 20 during the semi-active phase, and also a double-delay trigger from the repeat tracking and memory circuit 27 and sends a signal to the range information circuits 38, consisting of a square gate of length proportional to the true radar range and also a signal to the range switch circuit 39 which actuates the switch 41 for transferring over from the semiactive to the active phase of the missile.

When the missile is well within the range of its own radar transmitter 42 in the nose of the missile 11, the main trigger is applied directly to the transmitter and to the true range tracking and memory circuit 37. An automatic frequency control circuit 43 is connected to the transmitter 42, for frequency sampling and frequency control of the receiver 31.

If desired, as an added precaution, a three-second delay and switch 44 may be provided to switch-off the transmitter 23 in the tail of the missile during change-over and after a three-second delay to switch back to the transmitter 23, if the target-gating detector 33 sends a signal which indicates that the target is not gated. Alternatively, the three-second delay and switch 44 may be utilized to cut in the acquisition circuit 45 which transmits a search voltage which causes the target selector gate to oscillate slightly about its last position in search of the lost target.

The block diagram of FIGURE 4 illustrates one preferred form of the launching aircraft portion of the missile system of the present invention and consists of the transmitter 46 and receiver 47 of the large highly directive radar 15 and the transmitter 48 and receiver 49 of the small semi-directive radar 14.

The receiver 49 is connected to the self synchronous tracking circuit 51 which also receives a signal from the phaseable oscillator 52 tuned to the oscillator 21 in the missile. The signal from the tracking circuit 51 goes through two units of delay 53, a portion of which may be partially or wholly inherent in the transmitter 46, and then goes to the transmitter 46 which sends out a highly directive radar pulse to the target. The pulse reflected from the target to the receiver 47 goes to a tracking, memory, and target selector circuit 54, and thence to the directional and servo circuits 55 to cause the large radar to follow the target. The signal from the tracking circuit 54 also goes through a single unit of delay 56 to the transmitter 48 of the small radar 14 for relaying the signal to the receiver in the tail of the missile.

*Operation*

In the operation of the system of the present invention with particular reference to the preferred circuitry illustrated in FIGURES 3 and 4, the transmitter 23 in the tail of the missile on actuation by the main trigger sends out a synchronizing pulse to the launching aircraft 12 which is received by the receiver 49 of the small radar 14, and is relayed through the self synchronous tracking circuit 51 and two units of delay and then through the transmitter 46 of the large radar 15 where a highly directive radar pulse is sent out toward the target. The echo pulse which is reflected from the target follows one primary path Z and is received by the receiver 31 in the nose of the missile, from whence it goes to the primary tracking and memory circuit 24 and the target selector and AGC 32. The target selector 32 sends a post gating trigger pulse to the scanning-gate generator 35, which in turn sends the scanning gates to the RF scanning tubes 36 which is operatively associated with the receiver 31. The commutation gates from the scanning gate generator 35 go to the directional information circuits 34 together with a selected signal from the target selector 32. The primary delayed trigger from the primary tracking circuit 24 goes through the switch 28 to the repeat tracking and memory circuit 27 which generates and sends out a double-delayed trigger to the true range tracking and memory circuit 37 through switches 28 and 41.

Another echo signal from the target 13 follows the secondary path Y' where it is received by the receiver 47 of the large radar 15 in the launching aircraft and is relayed through one unit of delay 56 to the transmitter 48 of the small radar 14 on the launching aircraft. This signal follows the path X' to the receiver 20 in the tail of the missile. The received signals go to the secondary tracking and memory circuit 26 which sends the secondary delayed trigger to the true-range tracking and memory circuit 37 which in turn generates a square gate of length proportional to the true range which is sent to the range information circuit 38 and to the range switch circuit 39.

When the range between the missile 11 and the target 13 has diminished to the point where it is well within the range of the transmitter 42, the range-switch circuit 39 actuates the switch 41 to switch over from the semiactive to the active phase.

When the range-switch circuit 39 actuates the switch 41, it will be apparent that the main trigger will go directly to the true range tracking and memory circuit 37 and also to the transmitter 42 in the nose of the missile 11 which will send out pulses to the target directly, the transmitter 23 in the tail of the missile being cut off or disconnected during this phase by the three second delay and switch 44. The switch 41 also connects the received echo signals from the receiver 31 directly to the true-range tracking and memory circuit 37 and connects the true-range tracking and memory circuit 37 to send the target selector trigger to the target selector and AGC 32. In other words, the action of switch 41 is to switch the true-range tracking circuit from triggering on a secondary delayed trigger and tracking the double-delayed trigger to triggering on the main trigger and tracking the echo signal from the receiver in the nose of the missile. The time between the trigger pulse and the signal to be tracked in the passive phase is equivalent to the distance $2Z+d$ and the time between trigger and signal in the active phase is equivalent to the distance $2Z$, the range to the target and back, plus $d$, the inherent delay in the firing of the transmitter. Hence, if the true-range memory circuit accurately remembers the semiactive gate length, when switched to its active connection, continued tracking of the same target and continued measurement of the same range despite the switchover will be assured. Another circuit, where connections are switched in the conversion from semiactive to active, is the target selector and AGC circuit 32. The trigger to this circuit is switched from the output of the primary tracking circuit 24 to that of the true range tracking circuit 37, thereby making allowance for the difference in location of the transmitter in the missile from that in the launching aircraft. Thus, after the conversion the directional information circuit 34 acts upon the same selected target echo despite the switch in transmitters.

To notify the launching aircraft of a successful switchover and to provide a safety feature against loss of target at this time, a target gating detector 33 and the three second delay switching circuit 44 are provided. The actual length of the delay is somewhat arbitrary, but about three seconds is a reasonable time interval. At the instant of switchover two actions take place in this circuit. First, the trigger to the transmitter 23 in the tail of the missile is discontinued, and, second, a three-second timing device is started. Discontinuing the trigger to the transmitter 23 in the tail stops the action of both that transmitter and the transmitters in the launching aircraft, thereby avoiding any interference of these radars with the one in the nose of the missile. If, after three seconds, the target gating detector 33 shows that tracking has not been disrupted by the switchover, the firing of the transmitter 23 in the tail of the missile is permanently discontinued and the launching aircraft 12 is thereby notified that the missile is active and holding on its own. If, after three seconds, the tracking has been disrupted by the switchover, the three-second delay switching circuit may revert the system to the semiactive phase for awhile and try again to switch to active later in the flight. Alternatively, an acquisition circuit 45 may be switched into operation to cause the target-selector gate to oscillate slightly about its last position in search of the lost target. Such researching would quickly reacquire the lost target and then the acquisition circuit 45 would again be switched off. In regard to these features, however, it should be pointed out that reverting to the semiactive phase or actively reacquiring the target are only safety measures and in the great majority of instances the switchover will be successful without recourse to them.

During the semiactive phase and at the instant of the switchover, the range accuracy of the semiactive-to-active system should be the same as that of the semiactive system. During the active phase the range accuracy should be improved to something less than 50 feet, by elimination of modulator delay accumulated in the tracking circuit area.

The illuminating transmitter in the launching aircraft could be tuned slightly different from that in the missile in order to confuse the enemy during the flight of the missile, as it switches over from the semiactive to the active phase.

Obviously many modifications and variations of the present invention are possible in the light of the above teachings. It is therefore to be understood that within the scope of the appended claims the invention may be practiced otherwise than as specifically described.

What is claimed is:

1. A system for synchronization and range measurement with semiactive to active radar guided missiles comprising means on said missile for transmitting a synchronizing pulse, means on a launching aircraft for receiving said synchronizing pulse and transmitting a highly directive radar pulse toward a target, means in the nose of said missile for receiving a primary echo from said target, means on said aircraft for receiving a secondary echo from said target and relaying said secondary signal to said missile, means on said missile for comparing the time intervals required for the primary and secondary paths and determining the true radar range from the missile to the target, and means responsive to a predetermined range for transmitting a highly directive pulse from the nose of said missile and receiving an echo signal from the target directly and discontinuing the action of the transmitter in the missile.

2. A system for synchronization and range measurement with semiactive to active radar guided missiles comprising means on said missile for transmitting a synchronizing pulse, means on a launching aircraft for receiving said synchronizing pulse and transmitting a highly directive radar pulse toward a target, means in the nose of said missile for receiving a primary echo from said target, means on said aircraft for receiving a secondary echo from said target and relaying said secondary signal to said missile, means on said missile for comparing the time intervals required for the secondary path and twice the primary path and determining the true radar range from the missile to the target therefrom, and means responsive to a predetermined range for transmitting a highly directive pulse from the nose of said missile and receiving an echo signal from the target directly and discontinuing the action of the transmitter in the tail of the missile.

3. A system for synchronization and range measurement with semiactive to active radar guided missiles comprising means on said missile for transmitting a synchronizing pulse, means on a launching aircraft for receiving said synchronizing pulse and transmitting a highly directive radar pulse toward a target, means in the nose of said missile for receiving a primary echo from said target, means on said aircraft for receiving a secondary echo from said target and relaying said secondary signal to said missile, means on said missile for comparing the time intervals required for the primary and secondary paths and determining the true radar range from the missile to the target, means responsive to a predetermined range for transmitting a highly directive pulse from the nose of said missile and receiving an echo signal from the target directly and discontinuing the action of the transmitter in the tail of the missile, and means actuated after a predetermined delay for selectively switching back to the semiactive phase or to an acquisition circuit if tracking has been disrupted by the switchover.

4. A system for synchronization and range measurement with semiactive to active radar guided missiles comprising a launching aircraft having a small semidirective radar receiver and transmitter and a large highly directive radar transmitter and receiver, a missile having a semidirective radar transmitter and receiver in the tail thereof and a directive radar transmitter and receiver in the nose thereof, means for generating a trigger in said missile, said semidirective transmitter being responsive to said trigger for transmitting a synchronizing pulse therefrom, means for relaying with a double delay the pulse received by the small radar to the transmitter of the large radar in the launching aircraft, means in the launching aircraft for relaying the secondary echo pulse from the receiver of the large radar to the transmitter of the small radar with a single unit delay, means for generating a secondary delayed trigger from the pulse received from the launching aircraft along the secondary path, means for generating a double delayed trigger pulse at an interval equal to twice the interval for the pulse received by the missile along the primary path, means for generating a square-gate of length proportional to the actual range from said secondary and double delayed triggers, and means responsive to a predetermined range for switching over the circuits in said missile to discontinue the action of the transmitter in the tail of the missile and actuate the transmitter in the nose thereof and track the true range indicated by the interval between the pulse transmitted by the transmitter in the nose of the missile and the echo signal received by the receiver in the nose of the missile.

5. A system for synchronization and range measurement with semiactive to active radar guided missiles comprising a launching aircraft having a small semi-directive radar receiver and transmitter and a large highly directive radar transmitter and receiver, a missile having a semi-directive radar transmitter and receiver in the tail thereof and a directive radar transmitter and receiver in the nose thereof, means for generating a trigger in said missile, said semi-directive transmitter being responsive to said trigger for transmitting a synchronizing pulse therefrom, means for relaying with a double delay the pulse received by the small radar to the transmitter of the large radar in the launching aircraft, means in the launching aircraft for relaying the secondary echo pulse from the receiver of the large radar to the transmitter of the small radar with a single unit delay, means for generating a secondary delayed trigger from the pulse received from the launching aircraft along the secondary path, means for generating a double delayed trigger pulse at an interval equal to twice the interval for the pulse received by the missile along the primary path, means for generating a square-gate of length proportional to the actual range from said secondary and double delayed trigger, means responsive to a predetermined range for switching over the circuits in said missile to discontinue the action of the transmitter in the tail of the missile and actuate the transmitter in the nose thereof and track the true range indicated by the interval between the pulse transmitted by the transmitter in the nose of the missile and the echo signal received by the receiver in the nose of the missile, an acquisition circuit, and means actuated after a predetermined delay for switching to said acquisition circuit if tracking has been disrupted by the switchover.

6. A system for synchronization and range measurement with semiactive to active radar guided missiles comprising a launching aircraft having a small semidirective radar receiver and transmitter and a large highly directive radar transmitter and receiver, a missile having a semi-directive radar transmitter and receiver in the tail thereof and a directive radar transmitter and receiver in the nose thereof, means for generating a trigger in said missile, said semi-directive transmitters being responsive to said trigger for transmitting a synchronizing pulse therefrom, means for relaying with a double delay the pulse received by the small radar to the transmitter of the large radar in the launching aircraft, means in the launching aircraft for relaying the secondary echo pulse from the receiver of the large radar to the transmitter of the small radar with a single unit delay, means for generating a secondary delayed trigger from the pulse received from the launching aircraft along the secondary path, means for generating a double delayed trigger pulse at an interval equal to twice the interval for the pulse received by the receiver in the nose of the missile along the primary path, means for generating a square-gate of length proportional to the actual range from said secondary and double delayed triggers, means responsive to a predetermined range for switching over the circuits in said missile to discontinue the action of the transmitter in the tail of the missile and actuate the transmitter in the nose thereof and track the true range indicated by the interval between the pulse transmitted by the transmitter in the nose of the missile and the echo signal received by the receiver in the nose of the missile, an acquisition circuit, and means actuated after a predetermined delay for switching back to the semiactive phase if tracking has been disrupted by the switchover.

7. A system for synchronization and range measurement with semiactive to active radar guided missiles comprising a launching aircraft having a small semidirective radar receiver and transmitter and a large highly directive radar transmitter and receiver, a missile having a semi-directive radar transmitter and receiver in the tail thereof and a directive radar transmitter and receiver in the nose thereof, means including a stable master oscillator and a main trigger generator for generating a main trigger in said missile, said semi-directive transmitter being responsive to said trigger for transmitting a synchronizing pulse therefrom, means including a phaseable oscillator and a self-synchronous tracking circuit for relaying with a double delay the pulse received by the small radar to the transmitter of the large radar in the launching aircraft, means including a primary tracking and memory circuit and a repeat tracking and memory circuit for generating a double delayed trigger at an interval equal to twice the interval for the echo pulse received by the receiver in the nose of the missile along the primary path, means in said launching aircraft including a tracking memory and target selector circuit for relaying the secondary echo pulse from the receiver of the large radar to the transmitter of the small radar with a single unit of delay, means including a secondary tracking and memory circuit for generating a secondary delayed trigger from the secondary echo pulse received by the semi-directive receiver in the tail of the missile, means including a true range tracking and memory circuit for generating a square gate of length proportional to actual range from said double delayed trigger and said secondary delayed trigger, means including a range switch circuit associated with said true range tracking and memory circuit and responsive to a predetermined range for applying said main trigger directly to the true range tracking and memory circuit and also to the transmitter in the nose of the missile and disconnecting the main trigger from the transmitter in the tail of the missile, said range switch also connecting the true range tracking and memory circuit to the receiver in the nose of the missile and an acquisition circuit, and means including a three-second delay and switch and a target gating detector operatively associated with said true range tracking and memory circuit for selectively switching back to the semiactive phase or to said acquisition circuit if tracking has been disrupted by the switchover.

No references cited.